United States Patent
Dreesen

(10) Patent No.: US 12,086,577 B2
(45) Date of Patent: Sep. 10, 2024

(54) METHOD FOR CREATING AND EXECUTING A CONTROL PROGRAM FOR CONTROLLING AN AUTOMATION SYSTEM, AND AUTOMATION SYSTEM

(71) Applicant: Beckhoff Automation GmbH, Verl (DE)

(72) Inventor: Ralf Dreesen, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 155 days.

(21) Appl. No.: 18/060,538

(22) Filed: Nov. 30, 2022

(65) Prior Publication Data

US 2023/0101320 A1    Mar. 30, 2023

Related U.S. Application Data

(63) Continuation of application No. PCT/EP2021/065029, filed on Jun. 4, 2021.

(30) Foreign Application Priority Data

Jun. 5, 2020 (DE) ................... 10 2020 115 028.8

(51) Int. Cl.
    *G06F 8/53* (2018.01)
    *G05B 19/05* (2006.01)
    (Continued)

(52) U.S. Cl.
    CPC ............ *G06F 8/53* (2013.01); *G05B 19/056* (2013.01); *G06F 8/34* (2013.01); *G06F 8/42* (2013.01); *G06F 40/30* (2020.01); *G06F 40/58* (2020.01)

(58) Field of Classification Search
    None
    See application file for complete search history.

(56) References Cited

U.S. PATENT DOCUMENTS

| 8,086,664 B2 * | 12/2011 | Lo ..................... G05B 19/056 703/22 |
| 10,571,898 B2 * | 2/2020 | Reid .................... G05B 19/054 |

(Continued)

FOREIGN PATENT DOCUMENTS

WO    2018091741 A1    5/2018

OTHER PUBLICATIONS

Juurinen, Leo, "Test Automation for Control Applications on Distributed Control System," Tampere University, 2020, 45pg. (Year: 2020).*

(Continued)

*Primary Examiner* — Ryan D. Coyer
(74) *Attorney, Agent, or Firm* — Dorsey & Whitney LLP

(57) ABSTRACT

A method is provided for creating and executing a control program for controlling an automation system having a controller and a web server connected to the controller. The method includes creating a first version of a program code of a control program for the automation system in an input module of a web-based development environment executed in a web browser, in a code creating step; executing a translation module of the web-based development environment on the web server and translating the program code into a program code of a binary language, in a translating step; and executing the program code in the binary language with the aid of the controller of the automation system, in an executing step. An automation system is also provided.

22 Claims, 9 Drawing Sheets

(51) Int. Cl.
*G06F 8/34* (2018.01)
*G06F 8/41* (2018.01)
*G06F 40/30* (2020.01)
*G06F 40/58* (2020.01)

(56) References Cited

U.S. PATENT DOCUMENTS

| | | | |
|---|---|---|---|
| 10,901,387 B2 | 1/2021 | Kroner et al. | |
| 10,901,987 B2 * | 1/2021 | Portisch | G06F 16/2445 |
| 10,977,014 B2 * | 4/2021 | Glistvain | G06F 8/34 |
| 2012/0246610 A1 * | 9/2012 | Asadullah | G06F 8/33 |
| | | | 717/103 |
| 2014/0258970 A1 * | 9/2014 | Brown | G06F 8/47 |
| | | | 717/103 |
| 2015/0186119 A1 * | 7/2015 | Chouinard | G06F 8/33 |
| | | | 717/113 |
| 2018/0011465 A1 * | 1/2018 | Lo | G05B 19/4188 |
| 2019/0346819 A1 * | 11/2019 | Kroner | G06F 8/34 |
| 2020/0133651 A1 | 4/2020 | Holzer et al. | |
| 2020/0227178 A1 * | 7/2020 | Lombardi | G05B 19/41885 |

OTHER PUBLICATIONS

Langmann et al., "Demonstration: Cloud-Based Industrial Control Services," Springer, 2019, 7pg. (Year: 2019).*

Vyatkin, Valeriy, "Software Engineering in Industrial Automation: State-of-the-Art Review," IEEE, 2013, 16pg. (Year: 2013).*

Office Action dated Jul. 2, 2020 in connection with German patent application No. 10202015028.8, 36 pages including English translation.

International Preliminary Report on Patentability dated Aug. 23, 2022 in connection with International Patent Application No. PCT/EP2021/065029, 47 pages including English translation.

"Integrated development environment", Wikipedia, Aug. 26, 2021, 7 pages.

International Search Report and Written Opinion dated Sep. 9, 2021 in connection with International Patent Application No. PCT/EP2021/065029, 21 pages including English translation.

Godman, Max, "Role-Based Interfaces for Collaborative Software Development," Doctoral Symposium, UIST'11, Oct. 16, 2011, 4 pages.

* cited by examiner

METHOD FOR CREATING AND EXECUTING A CONTROL PROGRAM FOR CONTROLLING AN AUTOMATION SYSTEM, AND AUTOMATION SYSTEM

CROSS-REFERENCE TO RELATED APPLICATIONS

This patent application is a continuation of International Patent Application No. PCT/EP2021/065029, filed 4 Jun. 2021, METHOD FOR CREATING AND EXECUTING A CONTROL PROGRAM FOR CONTROLLING AN AUTOMATION SYSTEM, AND AUTOMATION SYSTEM, which claims the priority of German patent application DE 10 2020 115 028.8, filed 5 Jun. 2020, VERFAHREN ZUM ERSTELLEN UND AUSFÜHREN EINES STEUERPROGRAMMS ZUM STEUERN EINES AUTOMATISIERUNGSSYSTEMS UND AUTOMATISIERUNGSSYSTEM, the disclosure content of each of which is hereby incorporated by reference herein, in the entirety and for all purposes.

FIELD

The application relates to a method for creating and executing a control program for controlling an automation system. Moreover, the application relates to an automation system which is configured to execute the method for creating and executing a control program for controlling an automation system.

BACKGROUND

The technical discipline of automation technology (implementation, measurement, control/regulation, communication, human/machine interface, safety, etc.) has the object of automating machines incl. industrial robots and/or systems, i.e. to be able to operate them independently and without the involvement of a human being. A degree of automation (ratio of automated manufacturing steps to all manufacturing steps) in an automation system is higher, the more independent a respective machine in a system and/or a respective system is/are from human intervention.

The objects of automation technology are, among other things, a relief of humans from dangerous, strenuous and/or monotonous activities, an improvement of a quality by the technical system, a higher efficiency of the system and a cost reduction by the system. Through advances in machines, signal acquisition, signal processing and/or communication (networking) of components within the automation system, the degree of automation of an existing or a new system may be significantly increased compared to the state of the art.

Programmable logic controllers (PLCs) are usually used to control automation systems. Programmable logic controllers are used in process control engineering, e.g. to control production lines or chemical systems. Machine controllers embodied as programmable logic controllers control or regulate machines and systems by controlling actuators such as relays, drives or valves as a function of measured values recorded by sensors located on the machine or system.

Programmable logic controllers usually operate in an event-oriented manner and execute a control program periodically. Within an execution cycle, the signals from the sensors are read in and output values for the actuators are calculated and output on the basis of the signals.

Appropriately programmed control programs are required to control automation systems. In order to create corresponding control programs, appropriately configured Integrated Development Environments (IDE) are generally used, which provide the user with input options in the form of editors, each of which provides various input aids, such as auto-completion of the written program code. So-called IDEs also provide the user with translation functions that allow for translating the created program code into a binary language. Furthermore, IDEs are set up, among other things, to perform debugging processes that allow the user to find errors in the created program code.

Typically, IDEs are run locally on a desktop computer or on a laptop. However, this assumes that a corresponding IDE is installed on the computer to be used and that the computer used has sufficient computing power to perform the functions mentioned. Also, common IDEs are specified for corresponding operating systems. Thus, in order to create program code, the user is bound to the respective computer on which the IDE is installed. This represents a considerable restriction in the flexibility of the user and the way in which the programming of control programs in automation technology may be carried out.

SUMMARY

A method for creating and executing a control program for controlling an automation system that allows a user a high degree of flexibility is provided. Further a corresponding automation system is provided, which is configured to execute the method for creating and executing a control program for controlling an automation system.

EXAMPLES

A method for creating and executing a control program for controlling an automation system having a controller and a web server connected to the controller is provided, the method comprising:
establishing a connection between a client device and the web server via a web browser executed on the client device in a server connecting step, wherein a web-based development environment comprising an input module for creating a program code and a translation module for translating the created program code is installed on the web server, wherein the input module may be executed in the web browser, and wherein the translation module is configured to translate a program code of a first programming language into a program code of a binary language;
executing an instance of the input module in the web browser by the client device and establishing a connection of the client device to a work environment of the web server and the translation module of the work environment via the instance of the input module executed in the web browser in a work environment connecting step, wherein the translation module may be executed within the work environment;
creating a first version of a program code of a control program for the automation system in the first programming language in the instance of the input module executed in the web browser in a code creating step;
transferring the created first version of the program code from the instance of the input module running in the web browser to the work environment of the web server in a program code transferring step;
writing the transferred first version of the program code to a program file in the work environment in one writing step;

executing the translation module in the work environment and translating the program code created in the first programming language and written to the program file into a program code of the binary language with the aid of the translation module in a translating step;

transferring the program code in the binary language from the work environment to the automation system controller in a binary code transferring step; and executing the program code in the binary language by the automation system controller and control of the automation system based on the program code in an executing step.

This achieves the technical advantage that a method for creating and executing a control program for controlling an automation system may be provided, in which web-based programming of the program code of the control program is enabled via a web-based development environment. For this purpose, a web-based development environment having an input module for creating a program code and a translation module for translating the created program code into a binary program for controlling the automation system is installed on a web server. The input module of the web-based development environment may be executed in a web browser. The translation module, on the other hand, may be executed on the web server and is set up to translate a program code of any programming language into a program code of a binary language.

Thus, in order to create the control program, a user may connect to the web server via a web browser running on any client device and execute an instance of the input module of the web-based development environment in the web browser running on the client device. The client device may be a desktop computer, laptop, or any mobile device. This achieves that a user may create a program code of a control program from any client device. Thus, it is not required that a development environment including an input module be installed on the client device used to perform a programming process for creating the program code.

The instance of the input module executed in the client device's web browser is platform-independent and may run on any client device controlled by any operating system. This achieves platform independence of the web-based development environment.

DETAILED DESCRIPTION

Figure 1:
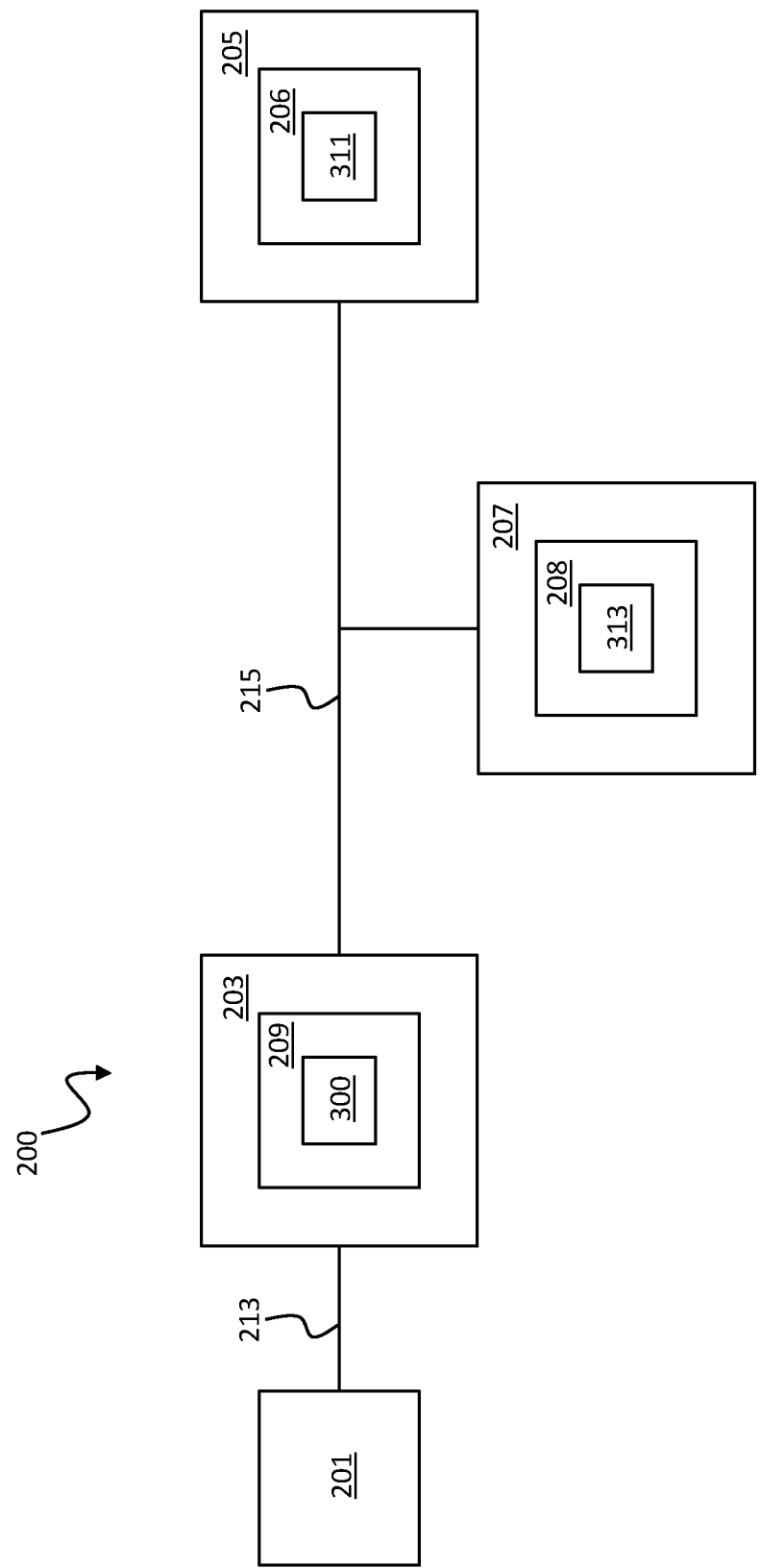
FIG. 1 a schematic depiction of an automation system according to an embodiment.

In order to create the program code of the control program, in the following the user creates a connection to a work environment set up on the web server via the instance of the input module executed in the web browser. In the work environment, a programming project may be set up that contains all the files, directories or databases necessary for creating the program code. The work environment thus enables the web server to be structured, as a result of which different programming projects may be arranged separately from one another. The work environment may e.g. be provided with password-protected access and allow connection exclusively to authorized users. This allows sensitive data of different users to be stored on the web server.

By executing the instance of the input module in the web browser, the user may subsequently create a version of the program code of the control program in any programming language from the respective client device used. By executing the instance of the input module in the web browser of the client device being used, the user is not tied to any particular client device to create the program code, thereby providing the user with a high degree of flexibility and allowing the user to create program code for a control program by using any client device at any location.

In the program code transferring step, only the changes made to the program code in the code creating step, on the basis of which the first version of the program code was created, may be transferred from the instance of the input module executed in the web browser to the web server via the Internet connection. This is of particular interest if the first version of the program code represents a modified version of an already created program code.

The first programming language may be any programming language or a programming language known from the state of the art for creating control programs of automation systems. In order to translate the created program code in the first programming language selected by the user into binary code executable by the controller of the automation system, the instance of the input module executed in the web browser transmits the created program code to the web server and causes it to write the transferred program code to a program file within the work environment.

A program file may in this context be embodied as a composite type and have a plurality of files arranged in corresponding directories. In this way, it may be achieved that the program code created in the programming language selected by the user is stored on the server, in particular in the corresponding work environment, so that it is not necessary to store the program code created on the client device used by the user to back up the programming project. This makes it possible to ensure that the user is not tied to the initially selected client device when continuing to edit the created program code, but may edit the already created program code from any client device.

The program file may further be embodied as a file in a main memory of the web server in a manner comparable to a buffer, so that changes to the program file do not have to be automatically stored in a permanent data memory of the web server, such as a hard disk.

In addition, the program file may be associated with an association file in the permanent data memory of the web server in which the contents of the program file may be stored, such that storage of the contents of the program file in the permanent memory of the web server may be achieved.

Furthermore, it is achieved that a memory area of the client device used for storing the program code created is not being occupied. This may save resources of the client device used.

By executing the translation module on the program code written to the program file, the program code may be translated into a corresponding binary code executable for controlling the automation system by the automation system controller. As a result, the translation process may be outsourced to the web server, so that computationally intensive translation of the generated program code on the client device may be avoided. Thus, a saving of resources of the used client device for creating the program code may be achieved.

In order to execute the binary code generated by the translation module of the program code previously generated in the instance of the input module by the controller of the automation system, the generated binary code may be transferred directly from the web server, in particular from the work environment, to a controller of the automation system connected to the web server and executed by the controller. In this way, a smooth transition between generating the program code and executing the respective control program by the controller of the automation system and associated control of the automation system may be achieved.

A cumbersome process, in which otherwise a program code is first created on a specially set up client device and translated into a binary code, which then has to be loaded onto a controller of an automation system so that the controller may execute the respective control program and thus control the automation system, may thus be avoided.

According to an embodiment, the method further comprises:
- establishing a further connection between a further client device and the web server via a further web browser executing on the further client device in a further server connecting step;
- executing a further instance of the input module in the further web browser of the further client device, and establishing a further connection of the further client device to the work environment of the web server via the further instance of the input module executed in the further web browser in a further work environment connecting step;
- transferring the first version of the program code written to the program file to the further instance of the input module executed in the further web browser of the further client device in a further program code transferring step;
- carrying out modifications to the program code and creating a second version of the program code in the first programming language in the further instance of the input module executed in the further web browser of the further client device in a modification creating step;
- transferring the second version of the program code from the further instance of the input module to the work environment of the web server in a modification transferring step;
- writing the second version of the program code to the program file in the work environment in a modification writing step;
- transferring the second version of the program code from the work environment to the client device's instance of the input module executed in the web browser in a second modification transferring step; and
- displaying the second version of the program code in the instance of the client device's input module running in the web browser in a displaying step.

This has the technical advantage of allowing for simultaneous processing of the generated program code by different users. For this purpose, a connection of the additional client device with the web server may be established via an additional web browser executed on the additional client device. Subsequently, a further instance of the input module may be executed in the further web browser of the further client device. In this regard, the further client device may be any desktop, laptop or mobile device and may be operated with any operating system, which may also be different from the operating system of the client device already connected to the web server. Furthermore, the two web browsers of the two client devices may be different web browsers. Thus, the various instances of the input module may be executed in different web browsers of different client devices.

A connection to the work environment may be established via the further instance of the input module executed in the further web browser of the further client device, and after transferring the program code written to the program file from the web server to the further instance of the input module executed in the further web browser, the created program code may be displayed in the further instance of the input module on the further client device. This allows different users to simultaneously perform editing of a program code from different client devices. Different users may thus contribute to create the same program code simultaneously and may do so from different devices.

Via the further instance of the input module, the further user may make changes to the created program code and create a second version of the program code. The second version of the program code may subsequently be transferred to the web server, in particular to the work environment, by the further instance of the input module running in the further web browser and written to the program file. The program file stored in the work environment of the web server may be modified by both the first user and the second user.

The second version written into the program file may subsequently be transferred to the first user, in particular to the instance of the input module running in the web browser of the client device, and displayed in it. This achieves that both users have the identical version of the program code displayed simultaneously in the input module executed in the web browser of the client device used in each case. The different users may thus track each other's changes, allowing for collaboration between the two users to create the program code. The individual users are thus able to obtain changes to the program code from the client device they are using and track each other's changes.

The second version of the program code created by the further user of the further client device may be written to the program file and thus stored on the web server. Furthermore, the second version written to the program file may be translated into a corresponding binary code by the translation module executed on the web server, in particular in the work environment, and this may be transferred to the controller of the automation system and executed by it to control the automation system. This makes it possible for program code to be created in cooperation by different users, using different client devices, to be translated using the web server, and to be executed by a controller of the automation system. Through this, a cooperative collaboration for performing a joint programming project for creating a control program for an automation system may be achieved.

According to an embodiment, only the changes to the program code made in the further instance of the input module are transferred from the second version of the program code in the modification transferring step and in the second modification transferring step.

This has the technical advantage that as little data as possible is transferred to the web server for the transmission of the different versions of the program code created by the various users. This makes it possible to achieve fast transmission and thus display of the changes made in the individual instances of the input module of the various users as simultaneously as possible. By transferring only the changes made to the individual versions of the program code, a prompt update of the program code written to the program file may be achieved.

According to an embodiment, the modification transferring step transfers the changes made in the further instance of the input module to the second version of the program code and the first version of the program code, the method further comprising:
 comparing the first version of the program code transferred in the second modification transferring step with the version of the program code written to the program file in a comparing step;
 determining a synchronization error in an error detection step if the first version of the program code does not match the version of the program code written to the program file;
 transferring the version of the program code written to the program file from the work environment to the further instance of the input module executed in the further web browser in a version transferring step; and
 displaying the transferred version of the program code in the further instance of the input module executed in the further web browser in a version displaying step.

This achieves the technical advantage that it is possible to synchronize the editing of the program code by the two users. In addition to the changes made, the respective version of the program code to which the changes were made by the respective user is also transferred from the respective instance of the input module to the web server and the transferred version of the program code is compared to the version of the program code written to the program file, which ensures that if several users edit the program code simultaneously, all users edit the identical version of the program code.

If the version of the program code transferred with the changes made does not match the version of the program code written to the program file, the transferred changes are not written to the program file and instead the version currently written to the program file is transferred to the respective user and displayed in the respective instance of the input module. This ensures that all users connected to the work environment are shown the current version of the program code written to the program file in each case, so that all users editing the respective program project may edit an identical version of the program code.

According to an embodiment, the modification transferring step transfers the changes made in the further instance of the input module to the second version of the program code and information relating to the first version of the program code, the method further comprising:
 comparing the information transferred in the second modification transferring step regarding the first version of the program code with the version of the program code written to the program file in a comparing step;
 determining a synchronization error in an error determining step if the information regarding the first version of the program code does not match the version of the program code written to the program file;
 transferring the version of the program code written to the program file from the work environment to the further instance of the input module executed in the further web browser in a version transferring step; and
 displaying the transferred version of the program code in the further instance of the input module executed in the further web browser in a version displaying step.

This achieves the technical advantage that by transferring the information relating to the first version to verify that the first version matches the version written to the program file, a reduced volume of data has to be transferred.

For example, information regarding the first version may be a version number that uniquely identifies the version of the program code. In the comparing step, the version number of the first version of the program code may then be compared to the version number of the version of the program code stored in the program file to determine whether the version numbers match or differ.

According to an embodiment, in the program code transferring step, each of the inputs made in the code creating step is transferred in an individual message, and in the modification transferring step, each of the changes made to the first version of the program code is transferred in an individual message.

This achieves the technical advantage of allowing for instant processing of the changes made by the web server and the associated instant updating of the versions of the program code written to the program file. A change to the program code may be a single keystroke of the client device or a single addition or deletion of a character in the program code displayed in the respective instance of the input module.

According to an embodiment, the translation module further comprises an analysis module for performing semantic analysis and/or syntactic analysis of the program code generated, the method further comprising:
 performing a global analysis of the program code created and written to the program file in the first programming language by the analysis module and determining global analysis results in a global analysis step, wherein the global analysis of the program code comprises a semantic analysis and/or a syntactic analysis of the entire program code based on semantics and/or grammar of the first programming language;
 transferring global analysis results determined in the global analysis step to the instance of the input module of the client device executed in the web browser and/or to the further instance of the input module of the further client device executing in the further web browser in an analysis result transferring step; and
 displaying the transferred global analysis results in the instance of the input module of the client device executed in the web browser and/or in the further instance of the input module of the further client device executed in the further web browser in an analysis result displaying step.

This achieves the technical advantage that during the programming process on the web server, in particular in the work environment of the web server, an analysis of the program code written to the program file may be carried out with regard to the correctness of the created program code in terms of semantics and grammar of the respective programming language used. Furthermore, it is achieved that during the programming process corresponding results of the semantic or syntactic analysis of the created program code may be displayed to the user in the respectively used instance of the input module, so that the user may already correct corresponding errors of the created program code during programming. This allows for the simplest possible programming process, during which syntactic or semantic errors in the program code are displayed to the user if necessary.

According to an embodiment, the transmission of the global analysis results is embodied as a response of the web server to a poll request of the instance of the input module of the client device executed in the web browser and/or to a poll request of the further instance of the input module of the further client device executed in the further web browser.

This has the technical advantage that an automatic display of the analysis results may be provided in the instance of the input module used by the user. For this purpose, the instance of the input module may make corresponding requests to the web server at a preset time interval as to whether corresponding global analysis results of the analysis module are available. As soon as the analysis of the program code written to the program file has been completed by the analysis module, the corresponding analysis results are transferred by the web server to the instance of the input module running in the web browser and displayed by it to the user. The user is thus automatically alerted to corresponding semantic or syntactic analysis results without having to execute a corresponding request. The users are thus automatically shown the corresponding analysis results by the instance of the input module used by them and do not have to initiate a corresponding analysis.

According to an embodiment, global analysis results include error messages regarding semantic and/or syntactic errors in the created program code, program objects used in the program code, and relationships between program objects used in the program code, wherein program objects include variables, functions, data types, namespaces, or other objects used in the program code.

This achieves the technical advantage that a plurality of information may be indicated to the user in the used instance of the input module used in each case regarding the program code created by it. By the analysis results produced in the global analysis, which cover both semantic and syntactic errors of the program code produced and/or variables, functions, data types, namespaces and other instances of the programming language used in each case, comprehensive information and input assistance may be made available to the user for programming of the program code as smoothly as possible.

According to an embodiment, the global analysis step further comprises:
creating an analysis version of the program code created and written to the program file in the first programming language by the analysis module in a snapshot step, the analysis version of the program code corresponding to the version of the program code written to the program file at the time the global analysis step is executed; and
carrying out the global analysis of the program code in the first programming language based on the analysis version in the global analysis step.

This achieves the technical advantage that during the execution of the global analysis by the analysis module an editing of the program code is made possible by the respective users. For this purpose, an analysis version of the program code written to the program file is first created, on the basis of which the corresponding global analysis of the program code is carried out by the analysis module. During the execution of the global analysis by the analysis module, which comprises the entire program code and is thus time-consuming, further changes may be made to the version of the program code written to the program file. This may be used to ensure that, despite the analysis module performing the global analysis, the user does not have to interrupt the programming process and may thus make further changes to the program code while the analysis is being performed. Since the analysis module acts on the previously created analysis version of the program code, further modifications to the version of the program code written to the program file do not interrupt the analysis of the analysis module, either. Thus, a simultaneous analysis of the program code by the analysis module and further made modifications of the program code by the respective users may be achieved.

According to an embodiment, the method further comprises:
creating a current version of the created program code written to the program file in the first programming language by the analysis module in an updating step, wherein a current version of the created program code written to the program file in the first programming language is created after each change of the program code by the instance of the input module of the client device and/or by the further instance of the input module of the further client device;
executing a local analysis of a part of the created program code written to the program file in the first programming language by the analysis module on the basis of the current version of the program code and determining local analysis results in a local analysis step;
transferring the local analysis results obtained in the local analysis step to the instance of the input module of the client device executed in the web browser and/or to the further instance of the input module of the further client device executing in the further web browser in a local analysis result transferring step; and
displaying the transferred local analysis results in the instance of the input module of the client device executed in the web browser and/or in the further instance of the input module of the further client device executing in the further web browser in a local analysis result displaying step, wherein the local analysis results include auto-completions, syntax highlighting, and other input assistance for inputs in the instance of the input module and/or the further instance of the input module.

This has the technical advantage that the user may be provided with further input aids by the input module. By the local analysis, only parts of the created program code are analyzed. For this purpose, a current version of the program code written to the program file is first created and the respective local analysis is executed on the current version. In particular, for each change to the program code that is transferred to the web server by the respective instance of the input module, a current version of the program code is created and a corresponding local analysis is performed.

In particular, this may achieve functions such as auto-completion of the program code created in the instance of the input module as well as the display of spelling errors and similar input aids. By creating a corresponding current version of the program code for each change of the program code, which may include each addition or deletion of a character of the program code, and by performing a local analysis of the current version, corresponding displays in the input module of the respective entry aids, such as auto-completion, syntax highlighting and the like, may be provided for each change made by the user.

According to an embodiment, the transfer of the local analysis results is embodied as a push message from the web server to the instance of the input module of the client device executed in the web browser and/or to the further instance of the input module of the further client device executing in the further web browser.

This has the technical advantage that an instantaneous display of the respective input aids may be provided in the respective instance of the input module. With the aid of the push messages, the corresponding results of the local analysis are thus automatically transferred by the web server to the respective instances of the input modules as soon as the corresponding local analyses have been performed.

According to an embodiment, the analysis module comprises a global analysis module for performing the global analysis and a local analysis module for performing the local analysis.

This achieves the technical advantage that global analyses and local analyses may be performed simultaneously. By having the global analyses performed by the global analysis module based on the analysis version of the program code and the local analyses performed by the local analysis module based on the current versions of the program code, interference of the two different analyses is avoided so that they may be performed independently and individually.

According to an embodiment, the translating step further comprises:
  translating the program code in the first programming language into a program code in a high-level language in a first partial translating step; and
  translating the program code in the high-level language into the program code in the binary language in a second partial translating step.

This achieves the technical advantage that a web-based development environment as flexible as possible may be provided. By translating the program code of the first programming language into program code of a high-level language and then translating the program code of the high-level language into a corresponding binary code, the simplest possible translation module with compatible back-end and front-end units may be provided for a large number of different first programming languages.

By dividing up the translation module into back-end and front-end units, of which the back-end unit provides a translation of the high-level language into a binary code and the front-end unit provides a translation of the first programming language into the high-level language, a simple adaptation of the translation module to different first programming languages or different controllers of the automation system is allowed for in that in each case only an adaptation of the front-end unit or an adaptation of the back-end unit has to be carried out. Thus, for an addition of a further first programming language, only a front-end unit needs to be modified, which is set up to perform a translation of the further first programming language into the high-level language, while the back-end unit may remain unchanged. For the use of the web-based development environment for a further controller with a further processor unit, only the back-end unit must be adapted to the translation of the high-level language into the binary language used by the further processor unit, while the front-end unit may remain unchanged.

According to an embodiment, the first programming language is a graphical programming language.

This has the technical advantage that the web-based development environment allows for developing a program code in a standard programming language for automation systems, for example Sequential Function Chart, Ladder Diagram or Function Block Diagram.

According to an embodiment, the method further comprises:
  executing a debugging process of the created program code by the translation module in a debugging step.

This has the technical advantage that the program code of the control program for the automation system created by the web-based development environment may be checked for functionality. In the debugging process, the functionality of the created control program may be tested.

According to an embodiment, the debugging step further comprises:
  translating the program code of the first programming language generated in the first programming language and written to the program file into a program code of the binary language in a debugging translation step;
  transferring the program code translated in the debugging translation step in the binary language from the work environment to the automation system controller in a debugging transfer step;
  executing the program code in the binary language by the automation system controller in a debugging execution step; and
  transferring information regarding the executed program code to the instance of the input module of the client device executed in the web browser and/or to the further instance of the input module of the further client device executed in the further web browser in a debugging information transferring step.

This achieves the technical advantage that a debugging process of the created program code may be initiated via the instance of the input module executed in the web browser, in which the execution of the created program code for checking the operability of the created program code is effected by the web server or by the automation system controller connected to the web server. Thus, the user may easily initiate the operation of the created program code from the client device used by the user, and does not need a direct connection to the controller of the automation system or a simulation device installed on the client device for simulating a controller of an automation system for checking the operability of the created program code.

In order to perform the debugging process, the created program code may be translated into a corresponding binary code by the translation module, the binary code may be transferred from the web server to the controller of the automation system and executed by it. Information, such as measured values from sensors of the automation system or other memory entries of the controller, may subsequently be transferred from the controller via the web server to the instance of the input module executed in the respective web browser and displayed by it to the user, so that a functionality of the created program code may be determined based on the behavior of the controller or the components of the automation system controlled by the controller.

According to an embodiment, the debugging translation step further comprises:

setting at least one breakpoint in the program code in a breakpoint setting step; and executing the program code in the binary language via the control of the automation system up to the breakpoint in the debugging execution step.

This achieves the technical advantage that a simple check of the functioning of the created program code is made possible. By setting appropriate breakpoints by a corresponding function within the respective instance of the input module executed in the web browser, an execution of the control program by the controller may be interrupted at desired points of the control program. This facilitates identification of an error within the program code of the control program that leads to a malfunction of the control program.

According to an embodiment, the work environment connecting step comprises:

generating the work environment on the web server in a work environment generating step; and setting up the translation module in the work environment in a setup step.

This achieves the technical advantage is achieved that when applying the input module executed in the web browser a new programming project may be started by setting up in the web server a corresponding work environment with a translation module. In the work environment one or a plurality of program files may be set up when the respective program code of the programming project is created. A users may thus conveniently start a new programming project via execution of the input module in the web server of a client device used by them, and store and edit the correspondingly created program code within a work environment provided for this purpose on the web server. Various programming projects may thus be stored individually in different work environments and separated from one another. This avoids the mixing of different projects.

According to an embodiment, a plurality of mutually separated work environments is generated on the web server, wherein the translation module may be executed in each work environment, and wherein an individual programming project may be executed in each work environment.

This has the technical advantage of enabling the clean separation of different programming projects in individually embodied work environments on the web server. The various work environments may also be provided with corresponding accesses, e.g. password-protected accesses, so that only authorized users may access the individual projects in the work environments. In this way, e.g. the functionality of the web-based development environment and in particular the computing power of the web server may be made available to different users for carrying out corresponding programming projects. Sensitive data on the web server may thus be stored.

For this purpose, a plurality of instances of the translation module may be created for the translation module of the web-based development environment set up on the web server. The various instances of the translation module may be executed in the various work environments. This allows for a plurality of different programming projects to be processed simultaneously. Each of the instances of the translation module may have an analysis module, so that local and global analyses of the program codes created within the programming environments may be carried out.

According to an embodiment, the web server is integrated in the controller of the automation system.

This achieves the technical advantage that the most compact unit possible may be provided between the web server and the automation system controller. By integrating the web server into the control of the automation system, an additional data processing system for operating the web server is not required.

According to an embodiment, the work environment further comprises a service module, wherein the service module is configured to perform computationally intensive operations of the input module executed in the web browser.

This has the technical advantage that computationally intensive processes may be outsourced to the web server. This may save resources of the respective client device. Computationally intensive processes of the input module may e.g. be layout algorithms, which are required in the programming of graphical programming languages to create the program code and are correspondingly computationally intensive.

An automation system comprising a controller and a web server connected to the controller are provided, wherein the web server may be connected to a client device and another client device, wherein the web server has a work environment and a web-based development environment installed thereon, and wherein the automation system is configured to execute the method according to the application for creating and executing a control program for controlling an automation system.

This achieves the technical advantage of providing an automation system in which it is possible to generate a program code of a control program for controlling the automation system by a web-based development environment installed on a web server.

In the following, the application is described in more detail by means of embodiment examples with reference to the attached schematic drawings, which are not to scale. Portions, elements, parts, units, components and/or schemes which have an identical or analogous embodiment and/or function are indicated by the same reference numerals in the figure description, the list of reference numerals, the patent claims and in the figures of the drawing.

In the invention, a feature may be positive, i.e., present, or negative, i.e., absent, with a negative feature not being explicitly explained as a feature unless the invention emphasizes that it is absent, i.e., the invention actually made and not one constructed by the prior art is to omit that feature.

The features of the description may also be interpreted as optional features; i.e. each feature may be understood as an optional, arbitrary or preferred, i.e. a non-binding, feature. Thus, it is possible to extract a feature, possibly including its periphery, from an embodiment example, in which case this feature may be applied to a generalized idea of the invention. The absence of a feature in an embodiment example shows that the feature is optional with respect to the invention.

FIG. 1 shows a schematic diagram of an automation system 200 according to an embodiment.

The automation system 200 shown in FIG. 1 comprises a controller 201 and a web server 203 that is connected to the controller via a data bus 213. A work environment 209 is set up on the web server 203 in which a web-based development environment 300 may be executed, the development environment 300 being installed on the web server 203. In the embodiment of the automation system 200 shown in FIG. 1, the controller 201 and the web server 203 are implemented by two individual data processing systems. Alternatively, the web server 203 may be integrated into the controller 201. Moreover, a connection to the Internet may be implemented via the data bus 213.

In the embodiment shown in FIG. 1, a client device 205 and a further client device 207 are further connected to the web server 203 via an Internet connection 215. The client device 205 has a web browser 206 installed, in which an instance of an input module 311 of the web-based development environment 300 is executed.

The further client device 207 has another web browser 208 installed, in which another instance of the input module 313 is executed.

The client device 205 and the further client device 207 may be any data processing device, e.g. an industrial computer, a desktop computer, a laptop, or any mobile device, e.g. a cell phone or tablet. The web browsers 206, 208 may be any web browsers known in the prior art and the client devices 205, 207 may be operated by any operating systems known in the prior art. Alternatively, a web browser may be integrated into an application program and executed as part of the application program.

The automation system 200 may be any industrial automation system and the controller 201 may be embodied as any controller of an automation system, in particular a programmable logic controller PLC.

As an alternative to the embodiment shown in FIG. 1, any number of client devices may be connected to the web server 203 via an Internet connection 215. In particular, the automation system 200 may comprise any number of web servers 203. In addition, any number of different work environments 209 may be established on the web server 203, each of which may execute web-based development environments 300.

Figure 2:
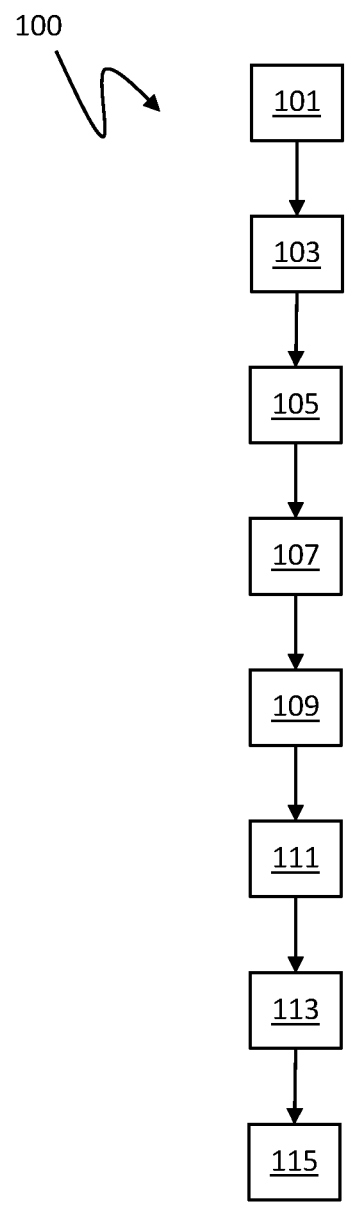
FIG. 2 a flowchart of a method for creating and executing a control program for controlling an automation system according to an embodiment.

FIG. 2 shows a flowchart of a method 100 for creating and executing a control program for controlling an automation system 200 according to an embodiment.

The embodiment of the method 100 in FIG. 2 is described with reference to FIG. 9 and the accompanying description.

The method 100 of creating and executing a control program for controlling an automation system 200 may be applied to automation systems having a controller 201 and a web server 203 connected to the controller 201, according to the automation system illustrated in FIG. 1.

In order to create a control program, a user may connect to the web server 203 via an Internet connection 215 in a server connecting step 101 via a client device 205 used by the user, such as a desktop computer or laptop or any mobile device, and a web browser 206 executed on the client device 205. This connection to the web server 203 may e.g. comprise a password-protected access process that requires the user to log in via an appropriately created user account.

After successfully connecting to the web server 203 on which the web-based development environment 300 comprising an input module 301 and a translation module 303 is installed, the user may load an instance of the input module 301 of the web-based development environment 300 and execute it in the web browser 206 of the client device 205 in a work environment connecting step 103. The instance of the input module 311 may comprise a corresponding graphical user interface GUI that provides input capabilities, such as text editors, to the user. The instance of the input module 311 may be structured similarly to Integrated Development Environments (IDE) known in the prior art.

Using the Graphical User Interface GUI of the instance of the input module 311 executed in the web browser 206, the user may establish a connection to a work environment 209 on the web server 201 in the work environment connecting step 103. The work environment 209 established on the web server 201 may comprise a corresponding programming project including a program file in which a program code of the control program to be modified is arranged. Alternatively, the user may set up a new programming project and create a new program code in the work environment 209 via the instance of the input module 300 executed in the web browser 206.

In addition to the program file containing the program code, a programming project may have any other files in which any information required for executing the programming process is stored. In addition, the programming project may comprise documentation of the program code or code for controlling the translation process. The individual files may be organized in appropriate directories. Furthermore, a programming project may have various databases required for the creation of a program code in a corresponding programming language and may e.g. comprise usable file types, functions and other objects of the respective programming language. In particular, the databases may be automatically filled with content. This is particularly the case when performing analyses of the program code created, during which analysis results are stored or temporarily stored in the databases.

To this end, in a code creating step 105, the user may create a first version of the program code to be created for a control program for the automation system 200 in a first programming language by making appropriate inputs to the instance of the input module 311 executed in the web browser 206. For this purpose, a corresponding program code may be created in a first programming language via various text editors or graphic editors of the input module 301 within the web browser 206 executed by the client device 205.

The first programming language used may be any text-based or graphical programming language known from the prior art. Alternatively, the first programming language may be a programming language known from the prior art used for automation systems, such as Sequential Function Chart SFC, Ladder Diagram LD or Function Block Diagram FBD.

Alternatively, the first programming language may be any text-based or graphical programming language known in the prior art.

The first version of the program code may be a newly created program code. Alternatively, the first version of the program code may be a modified version of an already created program code stored on the web server 203 within the work environment 209 under the corresponding programming project. To this end, the previously created program code may first be uploaded from the web server 203 to the instance of the input module 311 executed in the web browser 206 of the client device 205.

After creating the first version of the program code in the code creating step 105, the created first version of the program code may be transferred from the instance of the input module 311 executed in the web browser 206 to the web server 203 via the Internet connection 215 in a program code transferring step 107. The transfer of the created program code from the instance of the input module 311 executed in the web browser 206 to the web server 203 may be performed automatically by the instance of the input module 311 executed in the web browser 206 transferring appropriate messages to the web server 203 at predetermined time intervals.

Alternatively, in the program code transferring step 107, only the changes to the program code made in the code creating step 105, based on which the first version of the program code was created, may be transferred from the instance of the input module 311 executed in the web browser 206 to the web server 203 via the Internet connection 215. This is of particular interest if the first version of the program code represents a modified version of a previously created program code.

Alternatively, the user may transmit the program code that he or she has created from the instance of the input module 311 executed in the web browser 206 to the web server 203 via a corresponding transmitting function.

After successful transfer of the created program code to the web server 203, the transferred program code may be written to a program file within the work environment in a writing step 109. The program file of the work environment may have been created in the course of a newly created programming project. Alternatively, the program file may be part of an already existing programming project, while the created first version of the program code represents a modification of an already existing program code.

Comparable to a buffer, the program file may be formed as a file in a main memory of the web server 203 so that changes to the program file do not need to be automatically stored in a permanent data storage device, such as a hard disk, of the web server 203.

Moreover, the program file may be associated with an association file in the permanent data memory of the web server 203 in which the contents of the program file may be stored, such that storage of the contents of the program file in the permanent storage of the web server 203 may be achieved.

Alternatively, the program file may be stored in writing step 109 on the permanent data storage of the web server 203.

For example, a program file may be structured as a composite type and in turn may comprise other file components, such as parts of a comprehensive control program. The created program code may comprise a complete control program. Alternatively, the created program code may represent a part of a complex control program.

In a translating step 111, the translation module 303 of the web-based development environment 300 executable in the work environment 209 may be executed in the following, and the program code written to the program file written in the first programming language may be translated into a corresponding binary code of a binary language or a machine language. The binary code generated by the translation by the translation module 303 is adapted to the embodiment of the controller 201 of the automation system, so that the translated binary code may be executed by the controller 201.

After translating the generated program code in the translating step 111, the generated binary code may be transferred from the work environment 209 to the controller 201 of the automation system 200 in a binary code transferring step 113. This may e.g. be achieved via a corresponding data bus 213. The data bus 213 may e.g. be embodied as a local area network connection.

After the binary code has been transferred to the controller 201, it may be executed by the controller 201 in an executing step 115 and the automation system 200 may be controlled in accordance with the control program created.

Figure 3:
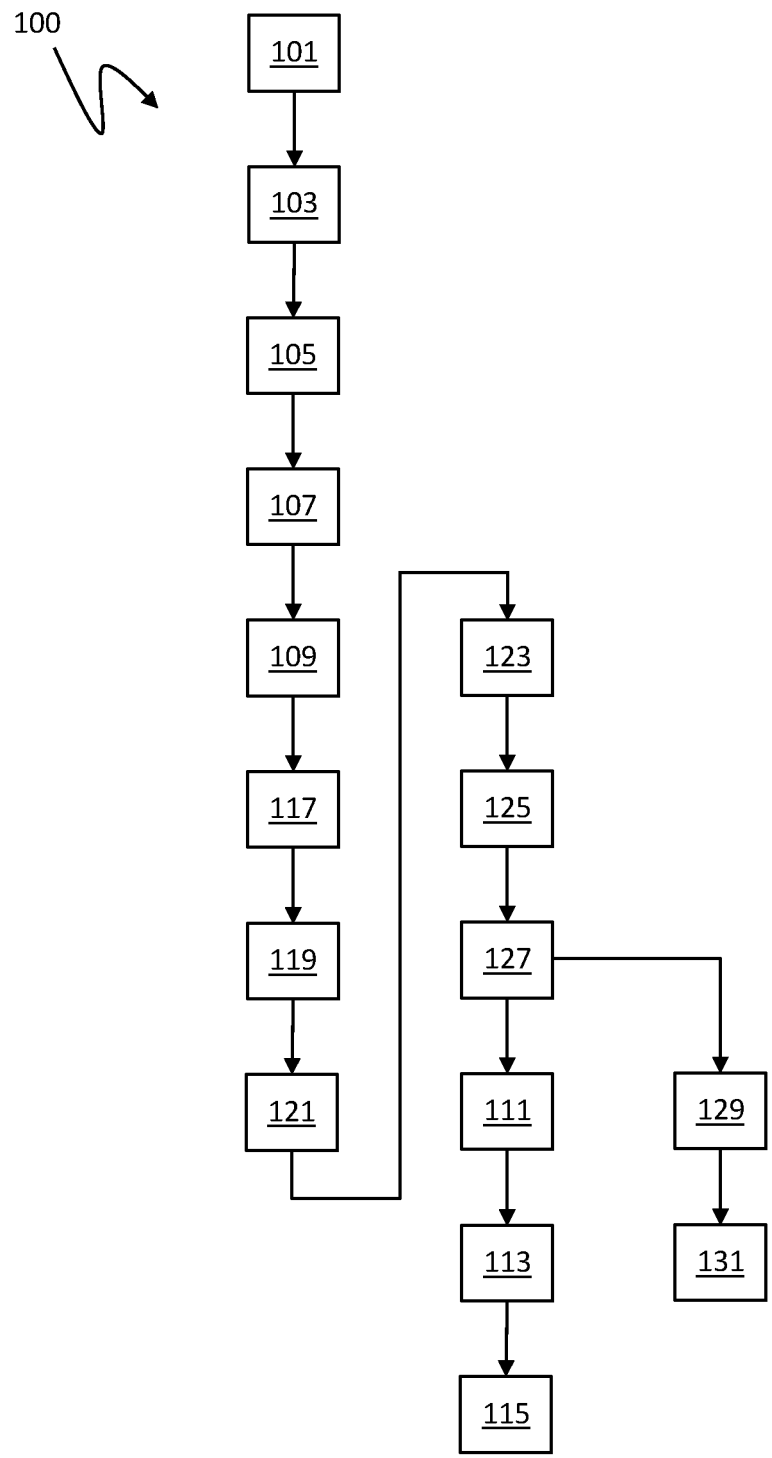
FIG. 3 a further flowchart of the method for creating and executing a control program for controlling an automation system according to a further embodiment.

FIG. 3 shows another flowchart of the method 100 for creating and executing a control program for controlling an automation system 200 according to a further embodiment.

The embodiment of the method 100 in FIG. 3 is based on the embodiment in FIG. 2 and comprises all the method steps of the embodiment in FIG. 2. Insofar as these remain unchanged in the embodiment in FIG. 3, a renewed detailed description is dispensed with.

Deviating from the embodiment in FIG. 2, the embodiment in FIG. 3 describes the creation of a program code by two users who simultaneously create the program code of the control program via individual client devices, for example, the client device 205 and the further client device 207 according to FIG. 1.

To this end, in a further server connecting step 117, a connection may be established between the further client device 207 and the web server 203 via a further web browser 208. The connection between the further client device 207 and the web server 203 may in turn comprise a password-protected access process in which the further user must log in to the server via a corresponding individual user account.

Subsequently, the further user may load a further instance of the input module 313 of the web-based development environment 300 installed on the web server 203 via the further web browser 208 of the further client device 207 and execute it in the further web browser 208 of the further client device 207 in a further work environment connecting step 119. The further instance of the input module 313 may have a graphical user interface GUI analogous to the instance of the input module 311, which within the further web browser 208 provides the user with appropriate input options for creating the program code. The two instances of the input module 311, 313 may be executed in different web browsers and in different client devices running different operating systems. For example, the client device 205 may be a desktop computer, while the further client device 207 is a mobile device.

Subsequently, a connection to the work environment 209 of the web server 203 may be established via the further instance of the input module 313. This may in turn comprise a password-protected access process.

Subsequently, in a further program code transferring step 121, the first version of the program code written to the program file may be transferred from the web server 203 to the further instance of the input module 313 and displayed therein. The further user may thus edit the version of the program code edited by the first user.

Subsequently, in a modification creating step 123, changes may be made to the first version of the program code and a second version of the program code may be created. For this purpose, the user may modify the program code downloaded from the work environment 209 of the web server 203 accordingly via corresponding inputs to the further instance of the input module 313. For this purpose, the user may use the editors provided in the input module 301, via which program code of the corresponding programming language may be created.

Subsequently, in a first modification transferring step 125, the second version of the program code may be transferred from the further instance of the input module 313 to the web server 203 and in particular to the work environment 209. In the first modification transferring step 125, the second version of the program code may be transferred in particular by transferring only the changes made in the program code. For this purpose, each individual change made may be transferred in an individual message from the further instance of the input module 313 to the web server 203.

After transferring the second version of the program code or the changes made to the work environment 209 of the web server 203, the second version of the program code may be written to the program file of the work environment 209 in a modification writing step 127. For this purpose, in particular only the changes made may be incorporated into the first version of the program code.

After writing the second version of the program code to the program file, in a second modification transferring step 129, the version written to the program file may be transferred from the work environment 209 to the instance of the input module 311 of the client device 205 executed in the web browser 206, and in a modification displaying step 131, the second version of the program code created by the further user of the further client device 207 and, in particular, the changes made to the program code may be displayed to the user of the client device 205 in the respective instance of the input module 311. This synchronization allows both users to work with the same version of the program code, so that simultaneous editing of the program code by a plurality of users is possible.

The transfer of the version of the program code written to the program file in the modification transferring step 129 may be performed automatically by the web server 203 automatically transferring the version of the program code to the instance of the input module 311 of the client device 205 after writing the version of the program code to the program file. Alternatively, the transfer of the version of the program code from the web server 203 to the client devices 205, 207 may be performed as response messages to corresponding requests to the web server 203 from the client devices 205, 207 and the instances of the input module 311, 313, respectively, in which the client devices 205, 207 and the instances of the input module 311, 313, respectively, request whether current versions of the program code are available.

After writing the second version to the program file in the modification writing step 127, the version of the program code written to the program file may be translated by the translation module 303 in the translating step 111 into a corresponding binary code, analogous to the embodiment in FIG. 2, which may be transferred to the controller 201 in the binary code transferring step 113 and executed by the controller in the executing step 115.

Figure 4:
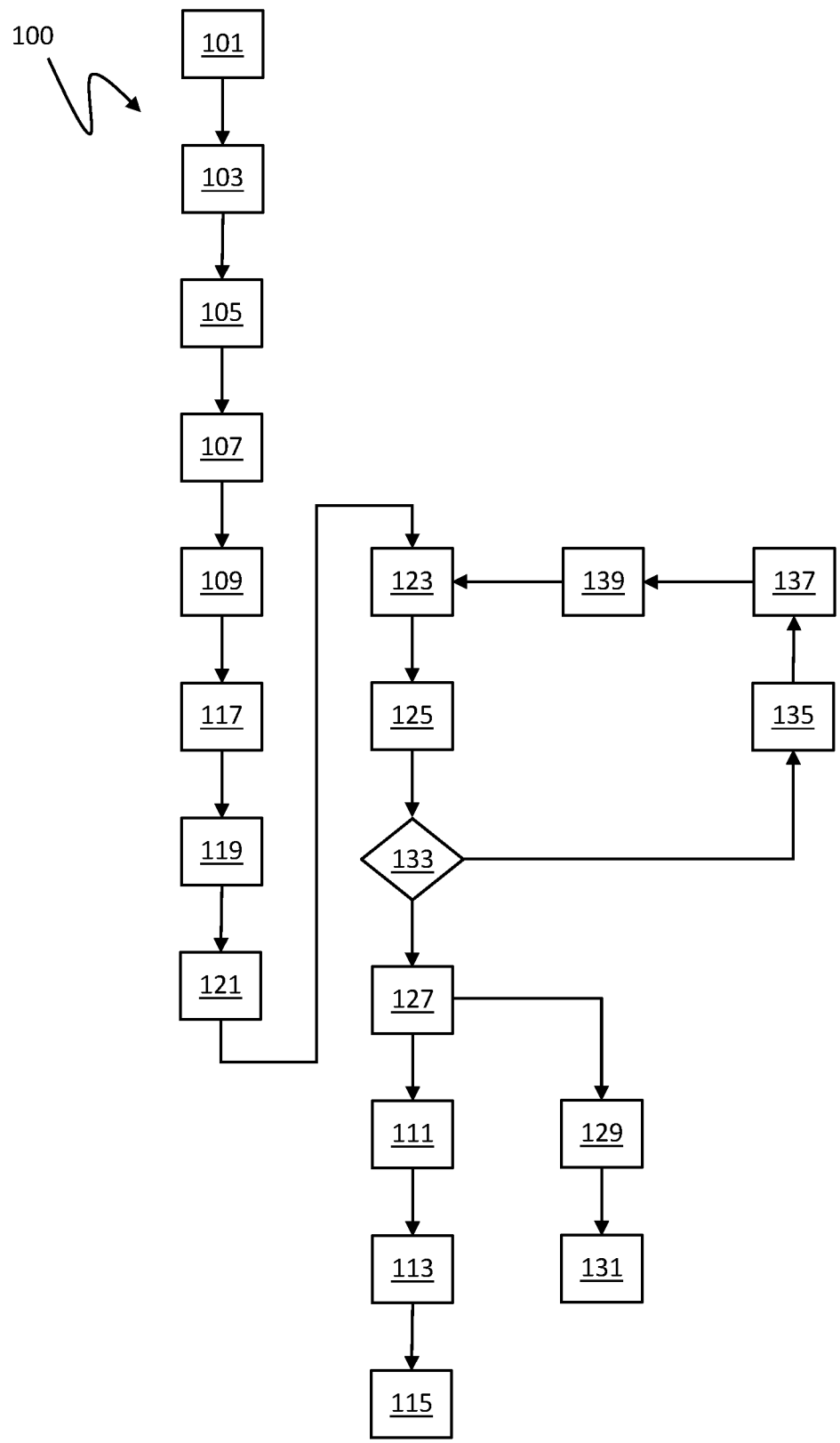
FIG. 4 a further flowchart of the method for creating and executing a control program for controlling an automation system according to a further embodiment.

FIG. 4 shows a further flowchart of the method 100 for creating and executing a control program for controlling an automation system 200 according to a further embodiment.

The embodiment in FIG. 4 is based on the embodiment in FIG. 3 and comprises all the method steps described there. Insofar as these remain unchanged in the embodiment in FIG. 4, a renewed detailed description is dispensed with.

Deviating from the embodiment in FIG. 3, in the embodiment in FIG. 4, in addition to the changes made to the first version of the program code, the first version or information regarding the first version of the program code, e.g. a version number, may be transferred to the web server 203 in the modification transferring step 125.

Subsequently, in a comparing step 133, the first version transferred in the modification transferring step 125, or the information regarding the first version of the program code on the basis of which the second version of the program code was created by making the corresponding changes, may be compared to the version written to the program file and stored in the work environment 209 on the web server 203. For example, the version numbers of the first version and the version of the program code written to the program file may be compared.

If it is detected in the comparing step 133 that the version of the program code written to the program file matches the version of the program code transferred in the first modification transferring step 125, e.g. if the version numbers match, the changes transferred in the first modification transferring step 125 may be written to the program file or incorporated into the respective version of the program code in the modification writing step 127.

If, on the other hand, the comparing step 133 detects that there is no match between the version of the program code of the program file and the version of the program code transferred in the first modification transferring step 125, e.g. due to a lack of match of the version numbers, a synchronization error is determined in an error message step 135. The synchronization error states that during the processing of the first version of the program code by the further user in the further instance of the input module 313, the version of the program code stored in the program file has been updated and thus changed. This may occur when multiple users make changes to the program code at the same time and these changes are stored in the program file. By determining the synchronization error in the error determining step 135, it may thus be avoided that different users work on different versions of the program code and modify them independently.

After determining the synchronization error, a version transferring step 137 may transfer the version written to the program file from the web server 203 to the further instance of the input module 313.

In a version displaying step 139, this transferred version of the program code written to the program file at the time of transfer may be displayed to the further user in the further instance of the input module 313 on the further client device 207. This may show the further user that while the further user has made changes to the first version of the program code to create a second version of the program code, that first version of the program code has already been modified by another user by adding further changes. By displaying the version of the program code of the program file in the version displaying step 139, the current version of the program code including the modifications made therein by the other user may thus be displayed to the further user.

Based on the version of the program code displayed in the version displaying step 139, the further user may make further changes and create a further version of the program code by making appropriate entries in the further instance of the input module 313 in the modification creating step 123. This allows for synchronizing the program code to be edited for different users, ensuring that the different users may edit an identical version of the program code at the same time. In addition, all users who edit the same program code at the same time are shown all the changes that have been made.

Figure 5:
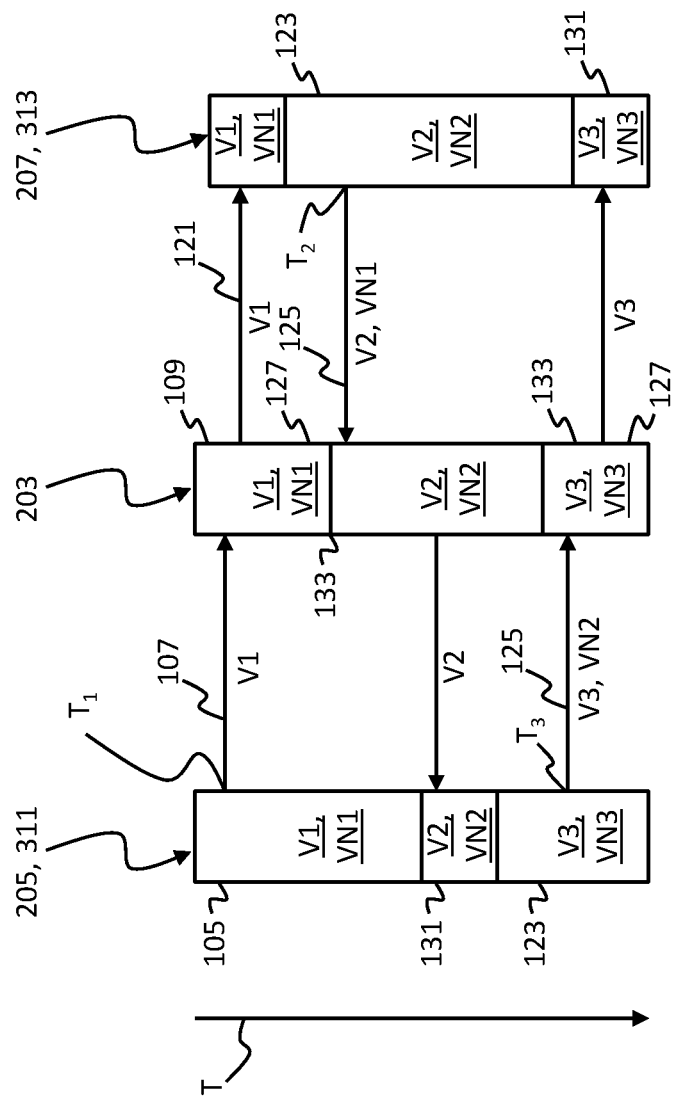
FIG. 5 a time-dependent flowchart of a data communication between the web server and the client devices of the automation system in FIG. 1 according to an embodiment.

FIG. 5 shows a time-dependent flowchart of a data communication between the web server 201 and the client devices 205, 207 of the automation system 200 in FIG. 1 according to an embodiment.

Figure 6:
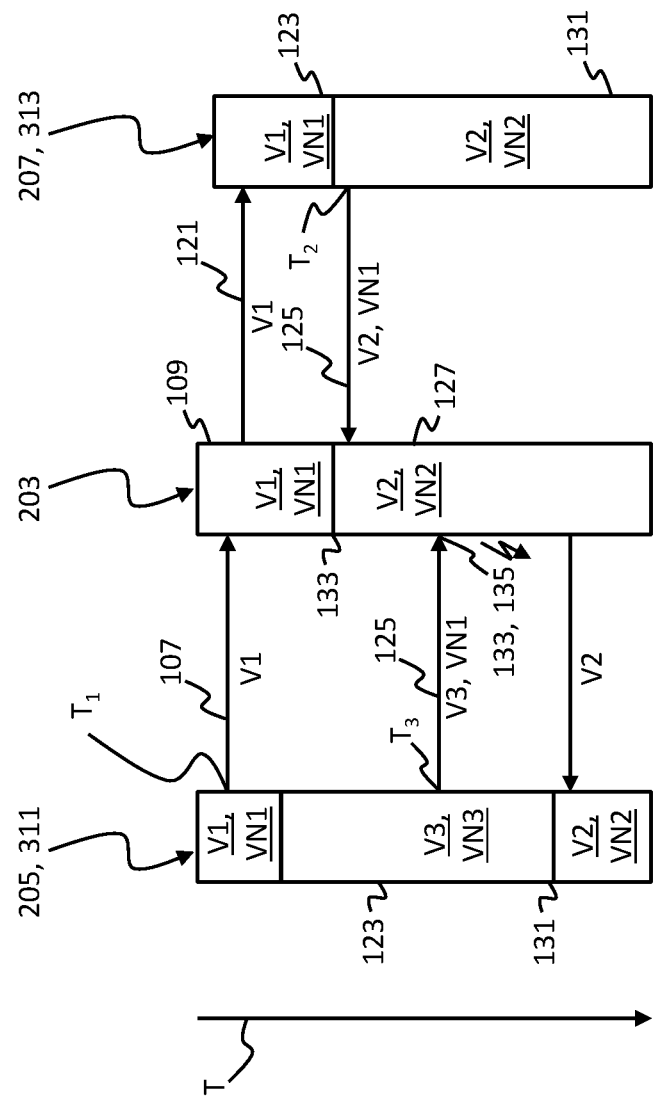
FIG. 6 a time-dependent flowchart of a data communication between the web server and the client devices of the automation system in FIG. 1 according to an embodiment.

FIGS. 5 and 6 each show a chronological sequence of the synchronization process described for FIG. 4 for the versions of the program code to be created that have been edited by several users.

In FIGS. 5 and 6, the right and left columns respectively depict the local states of the versions of the program code displayed in the respective instances of the input module 311, 313 of the two client devices 205, 207. The middle column depicts a timeline of the state of the web server 203 and describes the timeline of the versions of the program code stored in the program file.

In FIG. 5, a first user at the client device 205, using the instance of the input module 311 executed in the web browser 206, first edits the program code to be created and creates a first version of the program code V1 of the program code to be created.

After the first version of the program code V1 has been created by the first user in the instance of the input module 311, the first version of the program code V1 is transferred to the web server 203 at a first time T1 in the program code transferring step 107. In the web server 203, the transferred first version of the program code V1 is written to the program file of the work environment 209 in the writing step 109. The local state of the web server 203 is thus defined by the first version of the program code V1 written to the program file. In the program code transferring step 121, the web server 203 transfers the first version of the program code V1 written to the program file to the further user of the further client device 207.

The further user edits the first version of the program code V1 and creates a second version of the program code V2 in the further instance of the input module 313 executed in the further web browser 208. At a second time T2, the further instance of the input module 313 transmits the created second version of the program code V2 to the web server 203 in the modification transferring step 125. In the modification transferring step 125, the version number of the first version of the program code VN1 is transferred in addition to the changes made.

Subsequently, in comparing step 133, the transferred version number of the first version of the program code VN1 is compared to the version number of the version of the program code written to the program file. In the example shown in FIG. 5, at the time the web server 203 receives the transferred changes, the transferred version number of the first version of the program code VN1 corresponds to the version number of the version of the program code written to the program file. Thus, after the comparing step 133 has been performed, the changes of the second version of the program code V2 are written into the program file, so that the local state of the web server 203 includes the second version of the program code written into the program file.

Subsequently, the second version of the program code V2, or the changes made, is transferred from the web server 203 to the first client device 205 or the instance of the input module 311 executed in the web browser 206.

In the modification displaying step 131, the transferred changes of the second version of the program code are displayed in the instance of the input module 311, so that at this time the local state of the client device 205 is defined by the second version of the program code V2 displayed in the instance of the input module 311.

Subsequently, the user of the client device 205 modifies the second version of the program code V2 by making changes and creates a third version of the program code V3 in the modification creating step 123. Thus, the local state of the client device 205 at this time is defined by the third version of the program code V3 displayed in the instance of the input module 311.

At a third time T3, the instance of the input module 311 of the client device 205 transmits the third version of the program code V3, in particular the changes made to the second version of the program code V2, including the version number of the second version of the program code VN2 that served as the basis of the third version of the program code V3, to the web server 203, which in turn performs the comparing step 133 and compares the transferred version number of the second version of the program code VN2 with the version number of the versions of the program code written to the program file.

In the example shown in FIG. 5, the transferred version number second version of the program code VN2 corresponds to the version number of the version of the program code written to the program file, so that the changes are accepted and the third version of the program code V3 is written to the program file in the modification writing step 127. The local state of the web server 203 is thus defined by the third version of the program code V3 written to the program file.

Subsequently, the web server 203 transfers the third version of the program code V3 to the further instance of the input module 313 of the further client device 207. In the modification displaying step 131, the further instance of the input module 313 subsequently displays the third version of the program code V3 so that the local state of the further client device 207 after it has been changed to the third version is defined by the displayed third version of the program code V3.

FIG. 6 shows a time-dependent flowchart of a data communication between the web server 201 and the client devices 205, 207 of the automation system 200 in FIG. 1, according to an embodiment.

FIG. 6 shows a further example of the synchronization process. In contrast to FIG. 5, a synchronization error occurs in the example in FIG. 6.

Similar to the example in FIG. 5, the first user in the instance of the input module 311 first edits the program code and creates a first version of the program code V1.

At the point in time T1, this is transferred to the server 203, which writes the first version of the program code V1 to the program file and transfers it to the further user or further instance of the input module 313 of the further client device.

The further instance of the input module 313 displays the first version of the program code V1, and the further user of the further client device 207 edits the first version of the program code V1 and creates a second version of the program code V2.

At the point in time T2, the changes of the second version of the program code V2 including the version number of the first version of the program code VN1 are transferred to the web server 203. After performing the comparing step 133, the program server 203 writes the second version of the program code V2 to the program file.

Departing from the example in FIG. 5, in the example in FIG. 6 the first user of the client device 205, simultaneously with the editing of the first version of the program code V1 by the second user, edits the first version of the program code V1 that defines the local state of the client device 205 at that time and creates a third version of the program code V3.

At a third the point in time T3, the instance of the input module 311 transmits the third version of the program code V3, including the version number of the first version of the program code VN1 on which the third version of the program code V3 is based, to the web server 203.

In comparing step 133, the web server 203 compares the transferred version number of the first version of the program code VN1 to the version number of the version of the program code written to the program file. Since at this point in time the version of the program file and thus the local state of the web server 203 is defined by the second version of the program code V2 and thus the transferred version number of the first version of the program code VN1 does not match version number of the version of the program file corresponding to the version number of the second version of the program code VN2, a synchronization error is determined in the error determining step 135.

Subsequently, the transferred third version of the program code is not written to the program file. Instead, the second version of the program code V2 written to the program file at this time is transferred from the web server 203 to the instance of the input module 311 of the client device 205 of the first user.

In the modification displaying step 131, the second version of the program code V2 is subsequently displayed in the instance of the input module 311 of the client device 205. The changes to the second version of the program code V2 made in the meantime by the other user of the other client device 207 are thus displayed to the user of the client device 205, so that synchronization of the versions of the program code used in each case or of the states on the client devices 205, 207 of the different users is restored.

Figure 7:
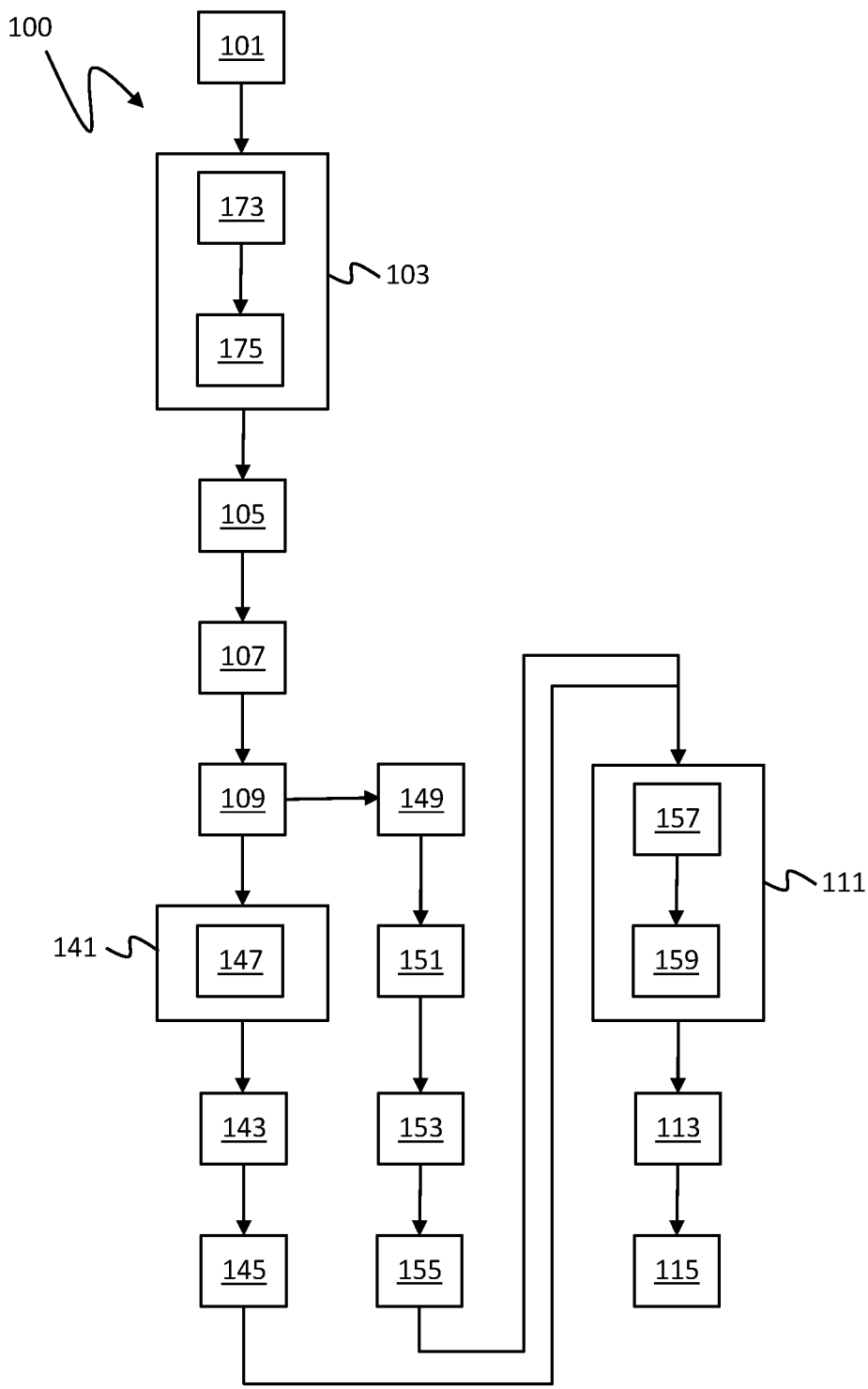
FIG. 7 a further flowchart of the method for creating and executing a control program for controlling an automation system according to a further embodiment.

FIG. 7 shows another flowchart of the method 100 for creating and executing a control program for controlling an automation system 200 according to a further embodiment.

The embodiment of method 100 in FIG. 7 is based on the embodiment in FIG. 2 and comprises all the method steps described there. Insofar as these remain unchanged in the embodiment in FIG. 7, a renewed detailed description is dispensed with.

Departing from the embodiment in FIG. 2, in the embodiment in FIG. 7, the work environment connecting step 103 comprises a work environment generating step 173. In the work environment generating step 173, the user connected to the web server 203 may generate a work environment 209 on the web server 203 via the web browser 206 executing on the client device 205.

For this purpose, the user may create a new programming project and arrange it in the newly created work environment 209. The created work environment 209 may further be provided with a password-protected access process, with the aid of which it may be ensured that only authorized users have access to the work environment 209 and the program project created therein.

Subsequently, in a setup step 175, the translation module 301 of the web-based development environment 300 may be set up in the newly generated work environment 209. This allows for the programming project created in the newly generated work environment to be executed via the web-based development environment 300.

Alternatively, an instance of the translation module 301 set up on the web server 203 may be generated to be executable in the work environment 209. In the event that a plurality of work environments 209 are set up on the web server 203, an individual instance of the translation module 301 may be created for each work environment 209, each of which may be executed exclusively in the respective work environment 209. The plurality of instances of the translation module 301 may be executed simultaneously. Thus, different programming projects may be processed simultaneously on the web server 203.

After successfully connecting to the work environment in the work environment connecting step 103, the user may create the desired program code in the code creating step 105 via the instance of the input module 311 executed in the web browser 206.

In contrast to the embodiment in FIG. 2, the embodiment in FIG. 7 allows global analyses and local analyses of the generated program code to be performed simultaneously or with a time delay.

For this purpose, the translation module 301 of the web-based development environment 300 comprises an analysis module that is set up to perform semantic and syntactic analyses of the created program code. The semantic and syntactic analyses performed are in this context based on the semantics and grammar of the respective programming language used to create the program code. In the event that an instance of the translation module 301 is generated for each work environment 209 of the web server 203, each such instance comprises an instance of the analysis module executable within the respective instance of the translation module 301 within the respective work environment 209.

After transferring the created program code in the program code transferring step 107 from the instance of the input module 300 to the web server 203 and writing the transferred program code to the program file in the writing step 109, a global analysis of the transferred program code may thus be performed by the analysis module in a global analysis step 141. A global analysis in this case takes into account the complete program code created and comprises, in particular, a lexical analysis of the program code as well as an analysis of the semantics and grammar used in the program code.

To this end, the global analysis step 141 may comprise a snapshot step 147 in which an analysis version of the generated program code may be generated. A copy of the program code may be created for this purpose. The global analysis is in the following performed based on the created analysis version of the program code. Since the global analysis comprises the complete created program code, it may be time-consuming. By creating an analysis version of the program code to be used for the global analysis, which remains unaffected by further changes to the program code written to the program file, it may be ensured that further changes to the program code may be made by the user simultaneously with the performance of the global analysis, without the user's programming process being blocked by the performance of the global analysis or the results of the global analysis being corrupted by simultaneous changes to the program code.

After creating the analysis version of the program code and performing the global analysis based on the analysis version of the program code, the generated results of the global analysis may be transferred from the web server 203 to the instance of the input module 311 executed in the web browser 206 of the client device 205 in a global analysis result transferring step 143.

In a global analysis results displaying step 145, the results of the global analysis may be displayed in the instance of the input module 311 executed in the web browser 206.

The results of the global analysis may in this context comprise error messages of syntactic or semantic errors in the generated program code. Furthermore, the results of the global analysis may include the variables, functions, data types, namespaces or other objects of the programming language used in the program code, which may be displayed in corresponding lists or display windows in the instance of the input module 311.

A local analysis of the created program code may be performed simultaneously or with a time delay to the global analysis. For this purpose, a current version of the program code may be created in an updating step 149. In particular, a current version of the program code may be created for each change made, in which the change carried out is recorded.

In contrast to the global analysis, in which primarily the semantic and syntactical correctness of the provided program code and/or the objects used in the program code are to be examined and/or identified, the local analysis serves to provide input assistance to the user, such as an auto completion and/or the coloring of code places and/or the highlighting of relevant special characters or keywords of the provided program code. The local analysis is thus carried out on the current versions of the program code, which are provided in each case after execution of a change of the program code. Beyond that, program objects of the program code may be identified and stored accessibly via the global analysis. For this purpose, e.g. appropriate databases may be generated.

For this purpose, a local analysis of a part of the created program code may be performed in the local analysis step 151 on each created current version of the program code. The local analysis only takes into account parts of the program code that are e.g. required to allow for automatic completion of the written program code. Thus, for each created current version of the program code, an individual local analysis may be performed in the local analysis step 151. After completing the local analysis, the determined local analysis results may be transferred to the instance of the input module 311 in a local analysis result transferring step 153.

In a local analysis result displaying step 155, the transferred local analysis results are displayed in the instance of the input module 311. These may e.g. be displayed by completing the written program code or graphically highlighting individual relevant parts of the program code as an input aid for the user.

In the program code transferring step 107, each performed modification of the created program code may be transferred to the web server 203 in an individual message. Thus, in the updating step 149, a current version of the program code may be created for each transferred modification and an individual local analysis may be performed in the local analysis step 151 based on this current version of the program code.

A modification of the created program code may in this context consist of the addition or deletion of a single character of the program code.

The analysis module of the translation module may further comprise a global analysis component and a local analysis component. Here, the global analysis component may be set up to perform the global analysis, while the local analysis component may be set up to perform the local analysis. By performing the global analysis with the aid of the global analysis component and the local analysis with the aid of the local analysis component, both analyses may be performed simultaneously without mutual interference.

The transfer of the global analysis results in the global analysis result transferring step 143 may be embodied as responses to corresponding poll queries by the instance of the input module 311 to the web server 203. The transmission of the local analysis result in the local analysis result transferring step 153 may be formed as push messages by the web server 203 to the instance of the input module 311.

Alternatively, the web server 203 may use push messages to notify the clients or instances of the input module 311 that current analysis results are available. Via corresponding poll messages, the clients or instances of the input module 311 may request the current analysis results from the web server 203.

Alternatively, corresponding local analyses may be triggered by the local analysis module 309 via corresponding poll messages from the clients to the web server 203. The local analysis module 309 then performs the local analyses, and the web server 203 sends the corresponding local analysis results to the clients or the instances of the input module 311 that requested the corresponding local analyses.

The global analysis and the local analysis described in the embodiment in FIG. 7 may be performed analogously to the creation of changes to the program code in the modification creating step 123 by additional users according to the embodiments in FIG. 3 and FIG. 4. Global and local analyses may thus be performed for all users participating in the creation or modification of the program code.

After performing the global analysis or the local analysis, the program code written to the program file may be translated in translating step 111. Prior to translating the program code in translating step 111, a plurality of global and local analyses of the generated program code may be carried out. In particular, a plurality of changes or modifications may be made to the version of the program code written to the program file.

In the embodiment shown in FIG. 7, the translation in translating step 111 comprises a first partial translating step 157 and a second partial translating step 159. In the first partial translating step 157, the program code created in the first programming language may be translated into a high-level language. The high-level language may e.g. be a C++ code. Alternatively, the high-level language may be any high-level textual language known in the prior art.

In the second partial translating step 159, the program code translated into the high-level language may be translated into a corresponding binary code executable by the controller 201 of the automation system 200.

In order to perform the first partial translating step 157 and the second partial translating step 159, the translation module may comprise a front-end component and a back-end component. The front-end component may in this context be set up to translate the program code of the first programming languages into a corresponding program code of the high-level language. The back-end component may be configured to translate the created program code of the high-level language into a corresponding binary code.

Figure 8:
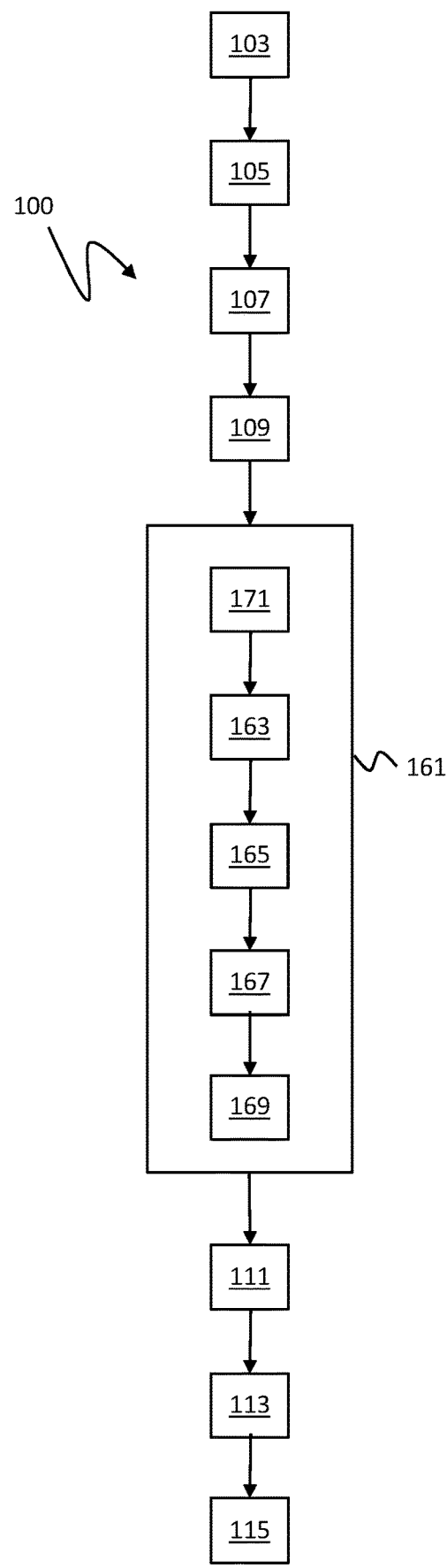
FIG. 8 a further flowchart of the method for creating and executing a control program for controlling an automation system according to a further embodiment.

FIG. 8 shows a further flowchart of the method 100 for creating and executing a control program for controlling an automation system 200 according to a further embodiment.

The embodiment in FIG. 8 is based on the embodiment in FIG. 2 and comprises all the method steps described there. The method steps unchanged in the embodiment in FIG. 8 will not be described again in detail below.

In the embodiment shown in FIG. 8, after writing the created program code to the program file in the writing step 109, a debugging process may be performed in a debugging step 161 to test the functionality of the created program code.

To this end, the debugging step 161 includes a debugging translation step 163 in which the program code written to the program file is translated into a corresponding binary code by the translation module.

Subsequently, the binary code generated in the debugging translation step 163 may be transferred to the automation system controller 201 in a debugging transfer step 165.

Subsequently, the binary code of the generated program code transferred to the controller 201 may be executed in a debugging execution step 167. During the execution of the binary code of the control program by the controller 201, various control parameters may be logged to provide an indication as to the functionality of the control program to control the automation system 200.

In a subsequent debugging information transferring step 169, the control parameters logged in the debugging execution step 167 may be transferred as information to the instance of the input module executed in the web browser 206. To this end, information may first be transferred from the controller 201 executing the control program to the web server 203. The transferred information or control parameters may be displayed to the user in the instance of the input module 311, thereby allowing for verifying the functionality of the generated program code. In addition, the debugging step 161 may include a breakpoint setting step 171 in which the created program code may be provided with appropriate breakpoints that allow for executing of the program code in the debugging execution step 167 to be stopped at a location of the program code marked by the set breakpoints.

The debugging step 161 may be initiated by the user by making an appropriate input to the input module 303.

The debugging execution step 167 may be carried out by the controller 201 of the automation system. Alternatively, a simulation module may be installed on the web server 203 that is set up to execute the debugging execution step 167 and simulate a controller of the automation system 200 based on the generated program code.

The debugging process in debugging step 161 may be performed in accordance with a debugging process known from the common prior art, in which the operability of the generated program code is verifiable.

The method 100 according to the application may be applied to any number of different users connected to the web server 203 via different client devices. Each of the users is able to create a program code for a control program for an automation system via an instance of the input module executed in the web browser of the client device used. The synchronization functions may be used to ensure that all users who simultaneously create or edit a common program code or display information about it may work on the identical version of the program code and have the changes made to the program code by the respective other users displayed. This allows for direct cooperation in which a program code for a control program of an automation system may be generated jointly in mutual exchange. The arithmetic operations for creating the program code or for translating the program code into binary code as well as for performing the individual analyses or a debugging process may be executed via the web server 203.

According to an embodiment, a client or further client may be any application program that connects to the server via the defined interface and obtains information from and transfers information to the server. A client or further client may further have a role other than that of an Intelligent Development Environment IDE.

Figure 9:
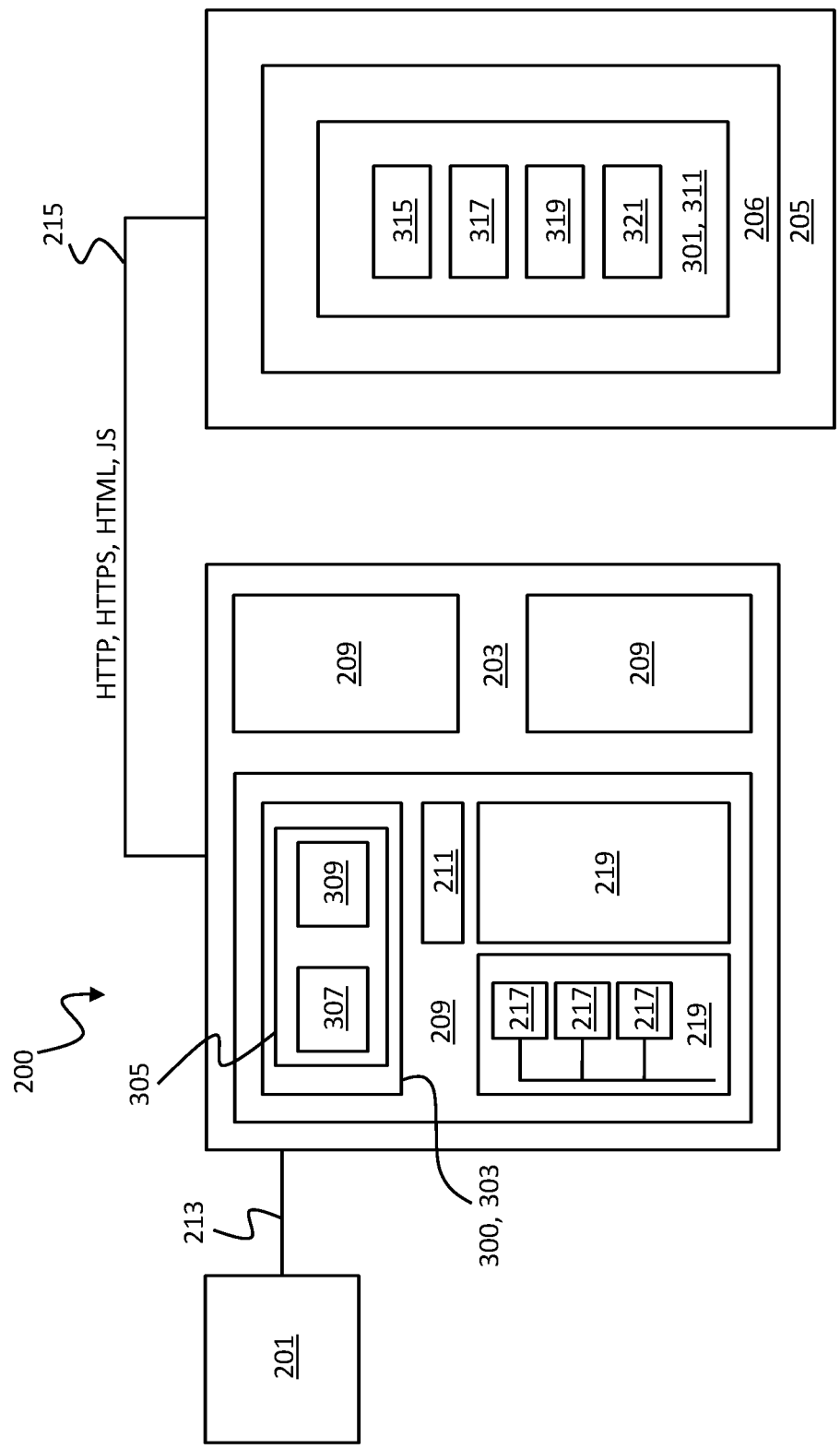
FIG. 9 a further schematic depiction of the automation system in FIG. 1 according to a further embodiment.

FIG. 9 shows another schematic depiction of the automation system 200 in FIG. 1 according to a further embodiment.

In the embodiment shown in FIG. 9, the automation system 200 comprises a controller 201 that is connected to a web server 203 via a data bus 213. Furthermore, a client device 205 is connected to the web server 203 via an Internet connection 215.

Three different work environments 209 are set up on the web server 203. In a work environment 209, an instance of the web-based development environment 300 installed on the web server is set up with a translation module 303. The translation module 303 includes an analysis module 305. The analysis module 305 comprises a global analysis module 307 and a local analysis module 309. The analysis module 305 is configured to perform an analysis of the generated program code. The global analysis module 307 is configured to perform a global analysis according to the global analysis step 141. The local analysis module 309 is configured to perform a local analysis of the created program code according to the local analysis step 151.

In the embodiment shown in FIG. 9, the work environment 209 further comprises a service module 211. The service module 211 is configured to carry out computationally complex algorithms. For example, the service module 211 may be configured to perform layout algorithms that are performed when programming a graphical programming language. The service module 211 may thus outsource computationally complex method steps that occur during programming of the program code to the web server 203, in order to conserve resources of the client device 205.

In addition, two independent programming projects 219 are set up in the work environment 209. Program files 217 arranged in a data structure are in this context assigned to a programming project 219, which may be processed within the programming project 219 and tp which corresponding program codes may be written.

Alternatively to the exemplary embodiment shown in FIG. 9, any number of different individual work environments 209 may be set up on the web server 203. Furthermore, any number of different programming projects 219 may be set up in each work environment, which may have any number of different program files 217 associated therewith.

The client device 205 comprises a web browser 206 in which an instance of the input module 311 of the web-based development environment 300 is executed. In the embodiment shown in FIG. 9, the instance of the input module 311 comprises a text editor 315, a Sequential Function Chart programming language editor SFC 317, a Ladder Diagram programming language editor LD 319, and a Function Block Diagram programming language editor FBD 321. The embodiment of the input module 301 shown in FIG. 9 is merely exemplary. Alternatively, the input module 301 may comprise further functions, editors and other components that are common for an Integrated Development Environment DIE known from the prior art.

A data communication between the client device 205 and the web server 203 may be implemented via an HTTP protocol or an HTTPS protocol. In particular, versions of program code may be exchanged between the web server 203 and the client device 205 using the HTTP protocol or the HTTPS protocol. Further communication between the web server 203 and the client device 205 may be implemented via a web socket channel.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals: 1-219

100 method for generating and executing a control program
101 server connecting step
103 work environment connecting step
105 code creating step
107 program code transferring step
151 local analysis step
153 local analysis result transferring step
155 local analysis result displaying step
157 first partial translating step

TABLE 1-continued

List of reference numerals: 1-219

| | |
|---|---|
| 109 writing step | 159 second partial translating step |
| 111 translating step | 161 debugging step |
| 113 binary code transferring step | 163 debugging translation step |
| 115 executing step | 165 debugging transfer step |
| 117 server connecting step | 167 debugging execution step |
| 119 further work environment connecting step | 169 debugging information transferring step |
| 121 further program code transferring step | 171 breakpoint setting step |
| 123 modification creating step | 173 work environment generating step |
| 125 modification transferring step | 175 setup step |
| 127 modification writing step | 200 automation system |
| 129 second modification transferring step | 201 control |
| 131 modification displaying step | 203 web server |
| 133 Comparing step | 205 client device |
| 135 error detecting step | 206 web browser |
| 137 version transferring step | 207 further client device |
| 139 version displaying step | 208 further web browser |
| 141 global analysis step | 209 work environment |
| 143 global analysis result transferring step | 211 service module |
| 145 global analysis result displaying step | 213 data bus |
| 147 snapshot step | 215 Internet connection |
| 149 updating step | 217 program file |
| | 219 programming project |

TABLE 2

List of reference numerals: 300-321

| | |
|---|---|
| 300 web-based development environment | |
| 301 input module | V1 first version of program code |
| 303 translation module | V2 second version of program code |
| 305 analysis module | V3 third version of program code |
| 307 global analysis module | |
| 309 local analysis module | T1 first point in time |
| 311 instance of input module | T2 second point in time |
| 313 another instance of input module | T3 third point in time |
| 315 text editor | |
| 317 editor for Sequential Function Chart (SFC) | VN1 version number of first version of program code |
| 319 editor for Ladder Diagram (LA) | VN2 version number of second version of program code |
| 321 editor for Function Block Diagram (FBD) | VN3 version number of third version of program code |

The invention claimed is:

1. A method for creating and executing a control program for controlling an automation system having a controller and a web server connected to the controller, the method comprising:

establishing a connection between a client device and the web server via a web browser executed on the client device in a server connecting step, wherein a web-based development environment having an input module for creating a program code and a translation module for translating the created program code is installed on the web server, wherein the input module may be executed in the web browser, and wherein the translation module is configured to translate a program code of a first programming language into a program code of a binary language;

executing an instance of the input module in the web browser by the client device and establishing a connection of the client device to a work environment of the web server and to the translation module of the work environment via the instance of the input module executed in the web browser in a work environment connecting step, wherein the translation module may be executed within the work environment;

creating a first version of a program code of a control program for the automation system in the first programming language in the instance of the input module executed in the web browser in a code creating step;

transferring the created first version of the program code from the instance of the input module executed in the web browser to the work environment of the web server in a program code transferring step;

writing the first version of the program code to a program file in the work environment in a writing step;

executing the translation module in the work environment and translating the program code created in the first programming language and written to the program file with the aid of the translation module into a program code of the binary language in a translating step;

transferring the program code in the binary language from the work environment to the controller of the automation system in a binary code transferring step; and executing the program code in the binary language with the aid of the controller of the automation system, and controlling the automation system based on the program code in an executing step.

2. The method according to claim 1, further comprising:

establishing a further connection between a further client device and the web server via a further web browser executed on the further client device in a further server connecting step;

executing a further instance of the input module in the further web browser of the further client device, and establishing a further connection of the further client device to the work environment of the web server via the further instance of the input module executed in the further web browser in a further work environment connecting step;

transferring the first version of the program code written to the program file to the further instance of the input module executed in the further web browser of the further client device in a further program code transferring step;

making changes to the first version of the program code and creating a second version of the program code in the first programming language in the further instance of the input module executed in the further web browser of the further client device in a modification creating step;

transferring the second version of the program code from the further instance of the input module to the work environment of the web server in a first modification transferring step;

writing the second version of the program code to the program file in the work environment in a modification writing step;

transferring the second version of the program code written to the program file from the work environment to the instance of the input module of the client device executed in the web browser in a second modification transferring step; and displaying the second version of the program code in the instance of the input module of the client device executed in the web browser in a modification displaying step.

3. The method according to claim 2, wherein in the modification transferring step and in the second modification transferring step of the second version of the program code, only the changes made to the first version of the program code in the further instance of the input module are transferred.

4. The method according to claim 2, wherein in the modification transferring step, the changes made to the first version of the program code and the first version of the program code in the further instance of the input module are transferred, and wherein the method further comprises:

comparing the first version of the program code transferred in the modification transferring step with the version of the program code written to the program file in a comparing step;

determining a synchronization error in an error determining step if the first version of the program code does not match the version of the program code written to the program file;

transferring the version of the program code written to the program file from the work environment to the further instance of the input module executed in the further web browser in a version transferring step; and displaying the transferred version of the program code in the further instance of the input module executed in the further web browser in a version displaying step.

5. The method according to claim 2, wherein in the program code transferring step each of the inputs made in the code creating step is transferred in an individual message, and wherein in the modification transferring step each of the changes made to the first version of the program code is transferred in an individual message.

6. The method according to claim 1, wherein the translation module further comprises an analysis module for performing a semantic analysis and/or a syntactic analysis of the program code generated, further comprising:

performing a global analysis of the program code written to the program file in the first programming language by the analysis module and determining global analysis results in a global analysis step, wherein the global analysis of the program code comprises a semantic analysis and/or a syntactic analysis of the entire program code based on a semantics and/or a grammar of the first programming language;

transferring global analysis results determined in the global analysis step to the instance of the input module of the client device executed in the web browser and/or to the further instance of the input module of the further client device executed in the further web browser in a global analysis result transferring step; and displaying the transferred global analysis results in the instance of the input module of the client device executed in the web browser and/or in the further instance of the input module of the further client device executed in the further web browser in a global analysis result displaying step.

7. The method according to claim 6, wherein the transfer of the global analysis results is embodied as a response of the web server to a poll request of the instance of the input module of the client device executed in the web browser and/or to a poll request of the further instance of the input module of the further client device executed in the further web browser.

8. The method according to claim 6, wherein global analysis results comprise error messages regarding semantic and/or syntactic errors in the created program code, program objects used in the program code, and relationships between the program objects used in the program code, and wherein program objects comprise variables, functions, data types, namespaces, or other objects used in the program code.

9. The method according to claim 6, wherein the global analysis step further comprises:

determining an analysis version of the program code written to the program file in the first programming language by the analysis module in a snapshot step, wherein the analysis version of the program code corresponds to the version of the program code written to the program file at the time of execution of the global analysis step; and executing the global analysis of the program code in the first programming language based on the analysis version in the global analysis step.

10. The method according to claim 6, further comprising:

creating a current version of the program code written to the program file in the first programming language by the analysis module in an updating step, wherein a current version of the program code written to the program file in the first programming language is created after each change of the program code by the instance of the input module of the client device and/or by the further instance of the input module of the further client device;

performing a local analysis of a part of the program code written to the program file in the first programming language by the analysis module based on the current version of the program code, and determining local analysis results in a local analysis step;

transferring the local analysis results determined in the local analysis step to the instance of the input module of the client device executed in the web browser and/or to the further instance of the input module of the further client device executing in the further web browser in a local analysis result transferring step; and displaying the transferred local analysis results in the instance of the input module of the client device executed in the web browser and/or in the further instance of the input module of the further client device executed in the further web browser in a local analysis result displaying step, wherein the local analysis results comprise auto-completions, syntax highlighting and other input assistance for inputs in the instance of the input module and/or the further instance of the input module.

11. The method according to claim 10, wherein the transfer of the local analysis results is embodied as a push message from the web server to the instance of the input module of the client device executed in the web browser and/or to the further instance of the input module of the further client device executed in the further web browser.

12. The method according to claim 6, wherein the analysis module comprises a global analysis module for performing the global analysis and a local analysis module for performing the local analysis.

13. The method according to claim 1, wherein the translating step further comprises:
   translating the program code in the first programming language into a program code in a high-level language in a first partial translating step; and
   translating the program code in the high-level language into the program code in the binary language in a second partial translating step.

14. The method according to claim 1, wherein the first programming language is a graphical programming language.

15. The method according to claim 1, further comprising: performing a debugging process of the program code written to the program file with the aid of the translation module in a debugging step.

16. The method according to claim 15, wherein the debugging step further comprises:
   translating the program code of the first programming language generated in the first programming language and written to the program file into a program code of the binary language in a debugging translation step;
   transferring the program code translated in the debugging translation step in the binary language from the work environment to the controller of the automation system in a debugging transfer step;
   executing the program code in the binary language by the controller of the automation system in a debugging execution step; and
   transferring information regarding the executed program code to the instance of the input module of the client device executed in the web browser and/or to the further instance of the input module of the further client device executed in the further web browser in a debugging information transferring step.

17. The method according to claim 15, wherein the debugging translation step further comprises:
   setting at least one breakpoint in the program code in a breakpoint setting step; and
   executing the program code in the binary language by the controller of the automation system up to the breakpoint in the debugging execution step.

18. The method according to claim 1, wherein the work environment connecting step comprises:
   generating the work environment on the web server in a work environment generating step; and
   setting up the translation module in the work environment in a setup step.

19. The method according to claim 1, wherein a plurality of mutually separated work environments is generated on the web server, wherein the translation module may be executed in each work environment, and wherein an individual programming project may be executed in each work environment.

20. The method according to claim 1, wherein the web server is integrated into the controller of the automation system.

21. The method according to claim 1, wherein the work environment further comprises a service module, and wherein the service module is configured to execute computationally complex operations of the input module executed in the web browser.

22. An automation system configured to execute the method according to claim 1, comprising:
   the controller, and
   the web server connected to the controller,
   wherein the web server is connectable to the client device and to a further client device,
   wherein the work environment and the web-based development environment are installed on the web server.

* * * * *